April 30, 1929.　　C. M. YOUNG, JR　　1,710,794
AUTOMATIC SKIP LOADER
Filed July 10, 1926
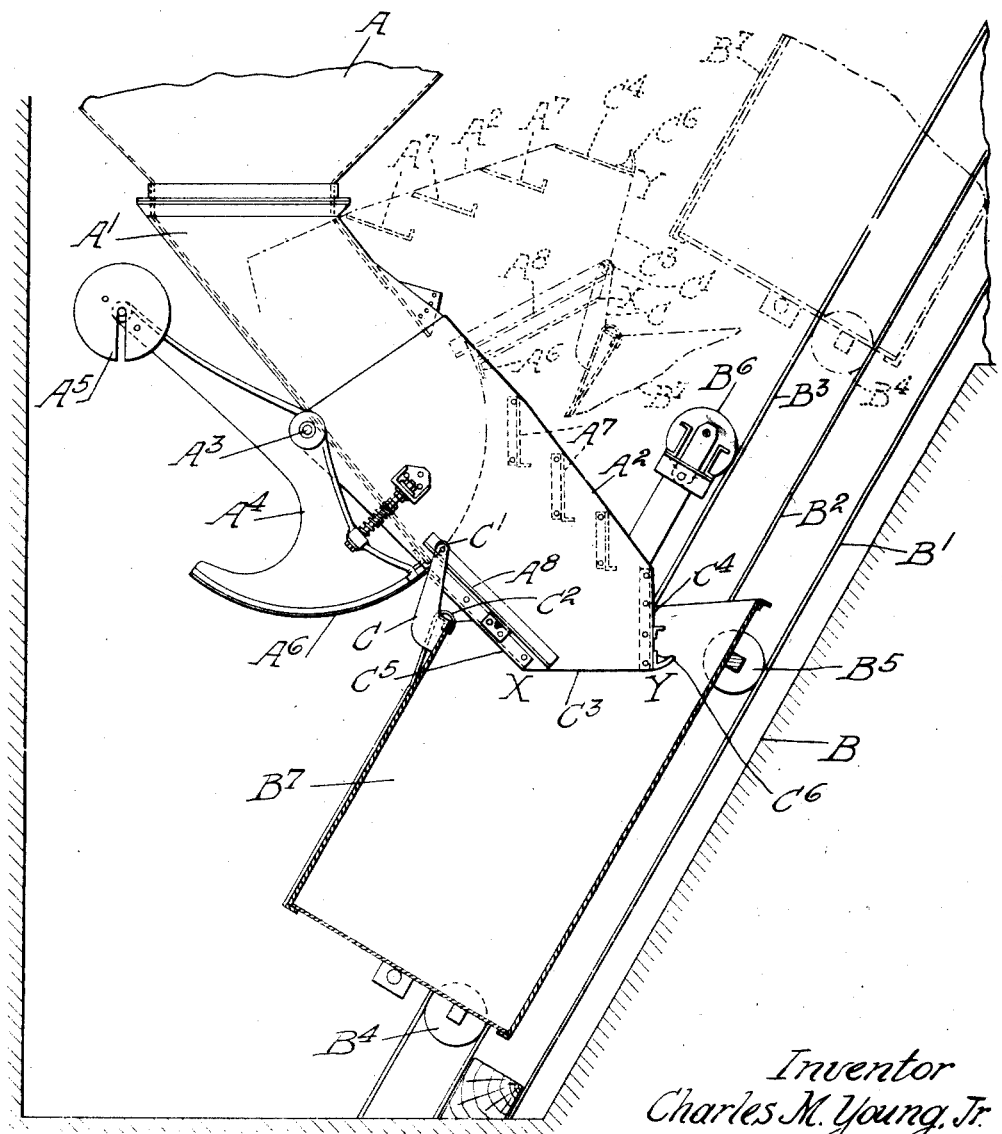
Inventor
Charles M. Young, Jr.
by Parker & Carter
Attorneys Patented Apr. 30, 1929.

1,710,794

UNITED STATES PATENT OFFICE.

CHARLES M. YOUNG, JR., OF PHILADELPHIA, PENNSYLVANIA, ASSIGNOR TO LINK-BELT COMPANY, OF CHICAGO, ILLINOIS, A CORPORATION OF ILLINOIS.

AUTOMATIC SKIP LOADER.

Application filed July 10, 1926. Serial No. 121,504.

My invention relates to improvements in automatic skip loaders and has for one object to provide a new and improved means whereby the chute which discharges into the skip at the lower end of its travel may be forced back out of the path of the skip if by any chance it drops down into a position where it might interfere with the passage of the skip to the loading position. This is accomplished by so shaping the face of the chute that it acts as a cam if engaged by the lower edge of the skip or by mounting on the chute a cam extension which projects slightly above or beyond the end of the chute and further away from the normal path of the skip so that even though the displacements of the chute may be considerable, still part of the cam surface will extend out beyond the line of the travel of the skip and permit the skip as it comes down to cam or wedge the chute back far enough to permit the skip to pass through. Other objects will appear from time to time throughout the specification and claims.

My invention is illustrated more or less diagrammatically in the accompanying drawing wherein is shown a side elevation in part section of the lower end of a skip loading system showing the skip, chute and hopper.

Like parts are indicated by like characters throughout.

A is a bin into which coal or other suitable material is fed. $A^1$ is a bin extension or chute extending down from the bin along an inclined path toward the path of the skip. $A^2$ is a chute extension mounted for rotation about the axis $A^3$ on the chute $A^1$ and associated with the supporting lever $A^4$ with counterweight $A^5$ and carrying gate $A^6$ to shut off the chute when the chute extension is raised into inoperative or dotted line position. $A^7$ are baffles in the open top of the chute extension $A^2$ to prevent outflow of the coal beyond the open top of the chute. $A^8$ are contact strips on the chute extension adapted to be engaged by the skip to operate the chute extension.

B is the pit into which the skip travels for loading. $B^1$ $B^2$ $B^3$ are tracks extending upwardly from the pit. In this case the tracks are inclined in the pit. Traveling on these tracks are rollers $B^4$ $B^5$ and $B^6$ carrying a skip $B^7$ having an open top into which the chute extension $A^2$ is adapted to discharge when in the position shown in full lines.

C is a control arm on the skip having a roller $C^1$ adapted to engage the contact strips $A^8$ and to pull the chute extension down from the dotted line to the full line position. $C^2$ is a contact cam on the skip adapted to engage the underside of the contact strips $A^8$ to throw the chute extension into the dotted line inoperative position on the up travel of the skip thereby closing off the chute by means of the gate $A^6$. $C^3$ is the open discharge end of the chute extension. $C^4$ is the end of the chute taking the form of a wall to deflect material which comes through the chute extension down into the skip or bucket. The downward extremity of the chute extension when in the open position from the point X to the point Y forms a cam when in the upper position inclined to the line of path of the skip, the inclination being such that if the chute extension should happen to drop down into the path of the skip before the skip comes down the edge of the bucket or skip would strike this cam surface and force the chute extension back to permit the skip to pass through.

$C^5$ is a separate cam member mounted on the plate $C^4$ in extension of the cam surface X—Y. It is tangent to it at the point Y but curves away so that even though the chute extension may swing down far enough so as to bring the cam surface X—Y clear inside the lines of travel of the skip, still the cam will be engaged by the skip and permit wedging of the chute extension out of the line of travel of the skip.

I claim:

1. The combination with a skip mounted for reciprocation in a generally vertical direction and a chute pivoted at one side of the path of the skip adapted to discharge into the open top of the skip and to be rotated out of line with the travel of the skip, of means mounted on the chute for permitting the skip to wedge the chute out of its path in the event that the chute drops into the path of the skip, said means comprising a cam wall on the chute adapted to be engaged by the bottom of the skip.

2. The combination with a skip mounted for reciprocation in a generally vertical direction and a chute pivoted at one side of the path of the skip adapted to discharge into the open top of the skip and to be rotated out of line with the travel of the skip, of means mounted on the chute for permitting the skip to wedge the chute out of its path in the event that the chute drops into the path of the skip, said means comprising a cam wall on the chute adapted to be engaged by the bottom of the skip, and a cam projecting upwardly from the end of the chute.

3. The combination with a skip mounted for reciprocation in a generally vertical direction and a chute pivoted at one side of the path of the skip adapted to discharge into the open top of the skip and to be rotated out of line with the travel of the skip, of means mounted on the chute for permitting the skip to wedge the chute out of its path in the event that the chute drops into the path of the skip, said means comprising a cam wall on the chute adapted to be engaged by the bottom of the skip, and a cam projecting upwardly from the end of the chute, the cam being rearwardly sloped away from the line of the cam surface on the chute.

4. The combination with a skip mounted for reciprocation in a generally vertical direction and a chute pivoted at one side of the path of the skip adapted to discharge into the open top of the skip and to be rotated out of line with the travel of the skip, of means mounted on the chute for permitting the skip to wedge the chute out of its path in the event that the chute drops into the path of the skip, said means comprising a cam mounted on the chute and adapted to be engaged by the skip.

5. The combination with a skip mounted for reciprocation in a generally vertical direction and a chute pivoted at one side of the path of the skip adapted to discharge into the open top of the skip and to be rotated out of line with the travel of the skip, of means mounted on the chute for permitting the skip to wedge the chute out of its path in the event that the chute drops into the path of the skip, said means comprising a cam mounted on the chute and adapted to be engaged by the skip, the cam being rearwardly sloped away from the extreme end of the chute.

6. In a skip hoist, the combination of a skip, a pivoted chute, means associated with the skip for rotating the chute into position above the skip to discharge thereinto at the end of the downward movement of the skip, means for rotating the chute away from the discharge position out of line with the skip on the upward movement of the skip and a cam on the chute adapted to be engaged by the skip to force the chute back out of line with the skip to permit passage of the skip when the chute has dropped down into the path of the skip before the skip comes down.

Signed at Philadelphia, county of Philadelphia, and State of Pennsylvania, this first day of July, 1926.

CHAS. M. YOUNG, Jr.